No. 685,686. Patented Oct. 29, 1901.
J. LAIDLAW & J. W. MACFARLANE.
BEARING FOR CENTRIFUGAL MACHINES.
(Application filed Mar. 7, 1900.)
(No Model.)
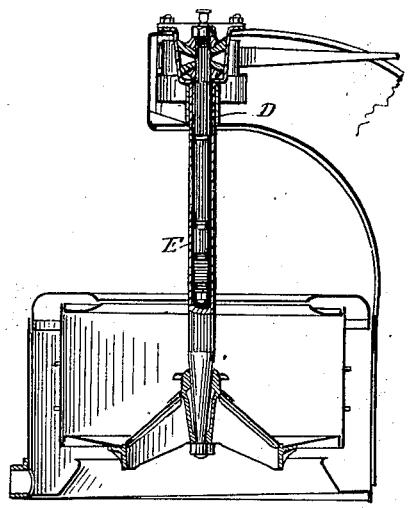
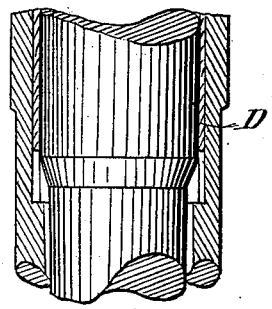
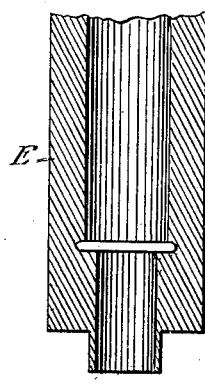
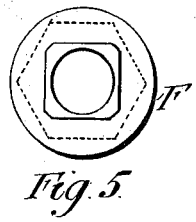
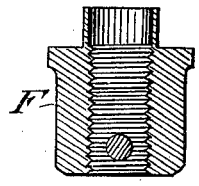
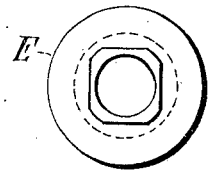
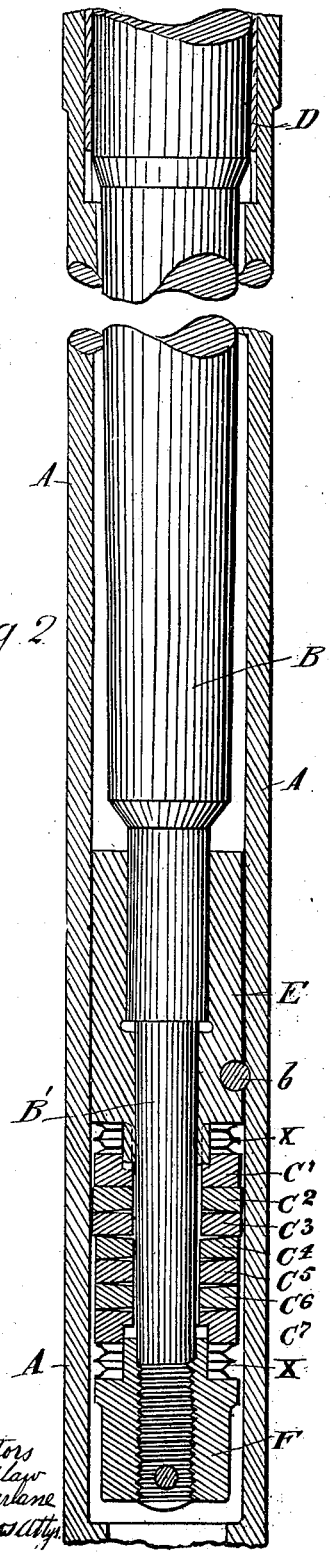

UNITED STATES PATENT OFFICE.

JOHN LAIDLAW AND JAMES WRIGHT MACFARLANE, OF GLASGOW, SCOTLAND.

BEARING FOR CENTRIFUGAL MACHINES.

SPECIFICATION forming part of Letters Patent No. 685,686, dated October 29, 1901.

Application filed March 7, 1900. Serial No. 7,726. (No model.)

*To all whom it may concern:*

Be it known that we, JOHN LAIDLAW, of the firm of Watson, Laidlaw & Coy., and JAMES WRIGHT MACFARLANE, manager of said firm, of 98 Dundas street, in the city of Glasgow, Scotland, engineers, have invented certain new and useful Improvements in Bearings for Centrifugal Machines, (for which we have applied for patents in Great Britain, No. 17,544, dated August 30, 1899; No. 20,192, dated October 9, 1899, and No. 22,994, dated November 18, 1899,) of which the following is a specification.

This invention is to improve the construction of the foot-step bearing of a spindle of the suspended centrifugal machine.

In order that our invention may be properly understood and readily carried into effect, we have hereunto appended one sheet of drawings, of which—

Figure 1 illustrates part of a centrifugal machine. Fig. 2 is an enlarged section of the spindle, showing the improved construction of the foot-step bearing. Fig. 3 is a section of the lower bush. Fig. 4 is a plan of the under side of the bush, Fig. 3. Fig. 5 is a plan of the upper side of the nut, Fig. 6. Fig. 6 is a section of the upper side of the nut, Fig. 5. Fig. 7 is a plan of the under side of the bottom washer.

The spindle consists of a main revolving spindle A, of sufficient diameter to permit of it being bored for about half its length from the upper end, and a spindle B, which is stationary, is placed inside the main or revolving spindle. The stationary spindle B, which projects above the revolving spindle, is attached to the framework supporting the machine. There is a bush D at the upper end of the revolving spindle and a bush E near the lower end of the hole which has been bored in it. These bushes form a bearing-surface sidewise for the stationary spindle. The lower end of the stationary spindle after it passes the bottom bush is reduced in diameter, as shown at B', and threaded for a nut F, and between the nut F and the lower bush E a number of disks or washers $C'$ $C^2$, &c., of steel or other metal, are introduced to form a foot-step or bearing to carry the weight of the revolving spindle and the basket or cage of the centrifugal machine, which is fixed to its lower end. The lower bush in the revolving spindle is secured in its place by a pin $b$ passing through the spindle and partly through the bush. The steel or other metal disks or washers which are placed between the lower bush and the nut F on the lower extremity of the internal or stationary spindle are sufficiently numerous to reduce the velocity of any two surfaces in contact to prevent the abrasion which might take place if only two surfaces were exposed. The upper washer $C'$ is attached to the lower bush, and therefore revolves with it. The lower washer $C^7$ is attached likewise to the nut F on the end of the stationary spindle, and therefore does not revolve. These attachments may be made by pins or by any other suitable means. We prefer to cut a square socket in the washers and make corresponding squares on the bush E and the nut F, as shown in Figs. 3, 4, 5, and 6. The intermediate washers $C^2$ $C^3$ $C^4$ $C^5$ $C^6$ are loose and are therefore free to divide the revolutions of the revolving spindle between them, and if the surfaces are uniform it may be assumed that there is a proportionate decrease of motion from the upper washer to the lower washer according to the number of washers between the upper one and the lower one. Hitherto it has been the practice to make these washers all alike in respect of their outside diameter and the size of the hole in the center. They, therefore, when piled one above the other form a hollow cylinder with parallel sides. These washers must have a working clearance both inside and outside, and if the clearance is greater between them and the revolving spindle and between them and the stationary spindle the speed of the washers will cause them to assume an eccentric motion equal to the amount of clearance between them and the stationary spindle, and they will therefore bear upon the stationary spindle. It has been found in practice that the washers which revolve fastest abrade the surfaces in contact with the stationary spindle, so that small particles of metal are detached, and these getting between the horizontal surfaces of the washers tend to cause heating and abrasion. In a similar manner when the clearance between the washers and the stationary spindle is greater than between the washers and the revolving spindle the washers will bear on the revolving spindle, and those which are running slowest tend to abrade in the same way and produce the same results. When the clearances are equal, the washers with the highest velocity of rubbing contact will tend to produce abrasion, which may be with the inner edges of the upper washers or the outer edges of the lower washers.

The object of this invention is to overcome the defect arising from having the washers made uniform in diameter and in the size of the hole. It is intended to increase the size of the holes in the faster-running upper free-washers $C^2 C^3$ or increase their outside diameter, as the case may be, or partly both, as shown, so that the washers will be in contact with the revolving spindle before they can touch the stationary spindle. The lowest washer—namely, $C^3$—in the group of the faster-running washers will be the one where the velocity of rubbing contact of the outer and inner edges is equal, or nearly so. The washers below this point would form a group $C^4 C^5 C^6$ of slower-running washers, which would be allowed to bear on the stationary spindle only and be quite free of the revolving spindle.

Between the bush E and the washer $C'$, which is attached to it, there are placed springs $x$ or other suitable elastic mediums. Also between nut F and the washer $C^7$, which is attached to it, similar springs are placed, so that in the event of any part of the washer-surfaces not being a true plane, or if the surface be a plane in any way inclined to the plane at right angles to the axis of the vertical spindle, the elastic medium will yield a little to the pressure caused by the unequal washers or inclined surfaces as they revolve upon one another, and thereby tend to prevent abrasion of the surfaces in contact. The springs or other elastic mediums may be placed upon the spindle, either above or below the washers or between any or each of them. It is well known that at the high speed at which these washers revolve an extremely slight deviation in the rubbing surfaces from a true plane coming in contact with a similar deviation or protuberance on the surface with which it is in contact causes intense pressure, owing to the suddenness with which the weight of the basket containing the load has to be raised in order to allow the protuberance or inclined surfaces to pass one another. Spherical-shaped washers have been used for the same purpose; but the sliding friction of the spherical surface is too great to allow the washer to adjust itself with sufficient rapidity to be effective.

In bearings of this class the revolving washers carry the oil around with them, and owing to centrifugal force the oil is caused to flow out from between the rubbing surfaces through the lubrication-grooves or oil-channels which are cut in their surfaces. The outside revolving spindle carries the oil around with it, and owing to centrifugal force the oil is kept away from the center. The rubbing surfaces, therefore, once the oil escapes, are left dry, and as a result they are apt to bind. In order to improve the lubrication by causing the oil to be forced in to the center and rise among the washers, we cut grooves in the bottom washer, as shown at $a$, Fig. 7, which, being attached to the bottom nut, does not revolve. We may also attach vanes to the stationary inner spindle to stop the oil revolving along with the outer spindle and cause it to flow through suitable channels to the inside of the revolving washers. In cases where we place the springs between the washers or in any place away from $x'$ we cut these grooves in the bottom nut itself.

Having now particularly described and ascertained the nature of our said invention and in what manner the same is to be performed, we declare that what we claim is—

1. In combination with the spindle and shaft of a centrifugal machine rotatable one upon the other and having fixed to them respectively a supporting-bush and a supporting-nut, a series of washers between said sleeve and nut, surrounding the spindle and having their central openings graduated to cause them to contact with the part with which they respectively revolve.

2. In a centrifugal machine the combination of a fixed supporting-spindle having a nut upon its lower end, a rotating shaft surrounding said spindle and having a bush fixed within it above the nut, and a series of washers surrounding the spindle within the shaft between the nut and bush; the openings of said washers being proportioned so that the upper washers of the series will contact with the rotating shaft with which they rotate, while the lower washers of the series will contact with the fixed spindle by which said washers are retarded or held stationary.

3. In combination with a spindle and a surrounding shaft of a centrifugal machine, and a nut and bush fixed to said parts respectively; a series of washers around the spindle, within the shaft, between the nut and bush, and an elastic medium interposed in said series of washers, substantially in the manner set forth.

4. In combination with a spindle and surrounding shaft of a centrifugal machine having a nut and a bush fixed thereto respectively; a series of washers around the spindle within the shaft and between the nut and bush, and an elastic medium above and below said series of washers and separating them from the nut and bush, as explained.

5. In combination with a spindle and surrounding shaft of a centrifugal machine with a nut and bush secured to said parts respectively; an antifriction medium interposed between the nut and bush formed with channels or grooves leading inwardly from the periphery toward the center whereby oil is forced in to the antifriction medium in opposition to centrifugal force tending to throw said oil outward.

6. In combination with a fixed spindle having a nut on its lower end and a surrounding rotating shaft, and an antifriction medium through which the shaft is vertically supported on the spindle; a washer fitted to the nut and having grooves or channels leading inwardly to conduct the oil to the antifriction medium in opposition to the centrifugal tendency which the oil receives from the rotating shaft.

In testimony whereof we affix our signatures in presence of two witnesses.

JOHN LAIDLAW.
JAMES WRIGHT MACFARLANE.

Witnesses:
JOHN SIDDLE,
EDITH MARY EDMONDSTONE.